United States Patent

Bernhardt

[11] 3,899,245
[45] Aug. 12, 1975

[54] TESTING DEVICE FOR CINEMATOGRAPHIC CAMERAS

[75] Inventor: Helmuth Bernhardt, Bad Kreuznach, Germany

[73] Assignee: Jos. Schneider & Co. Optische Werke Kreuznach, Bad Kreuznach, Germany

[22] Filed: Dec. 3, 1973

[21] Appl. No.: 421,481

[52] U.S. Cl.............. 352/72; 352/78 R; 352/136; 352/198; 352/244; 354/75; 354/354; 356/124
[51] Int. Cl. ............................................. G03b 23/02
[58] Field of Search ............ 352/72, 136, 138, 198, 352/244; 356/124, 125, 126, 127, 96; 350/96 B; 354/77, 354, 75

[56] References Cited
UNITED STATES PATENTS

| | | |
|---|---|---|
| 2,378,930 | 6/1945 | Kendall et al................ 356/126 |
| 2,803,993 | 8/1957 | Herrmann et al............. 352/226 X |
| 3,574,464 | 4/1971 | Howland.............................. 356/126 |
| 3,592,535 | 7/1971 | Gerry............................... 354/77 X |

FOREIGN PATENTS OR APPLICATIONS

| | | |
|---|---|---|
| 1,167,240 | 9/1967 | United Kingdom................ 356/125 |

Primary Examiner—Samuel S. Matthews
Assistant Examiner—Alan Mathews
Attorney, Agent, or Firm—Karl F. Ross; Herbert Dubno

[57] ABSTRACT

A cartridge inserted into camera to check its performance contains an endless film strip with a series of test frames to be projected via the camera objective upon a screen. The film, led around a set of rollers in the cartridge, is transluminated by a fiber-optical cable plugged into the cartridge and into a light box, the latter containing a heat-protective filter.

7 Claims, 3 Drawing Figures

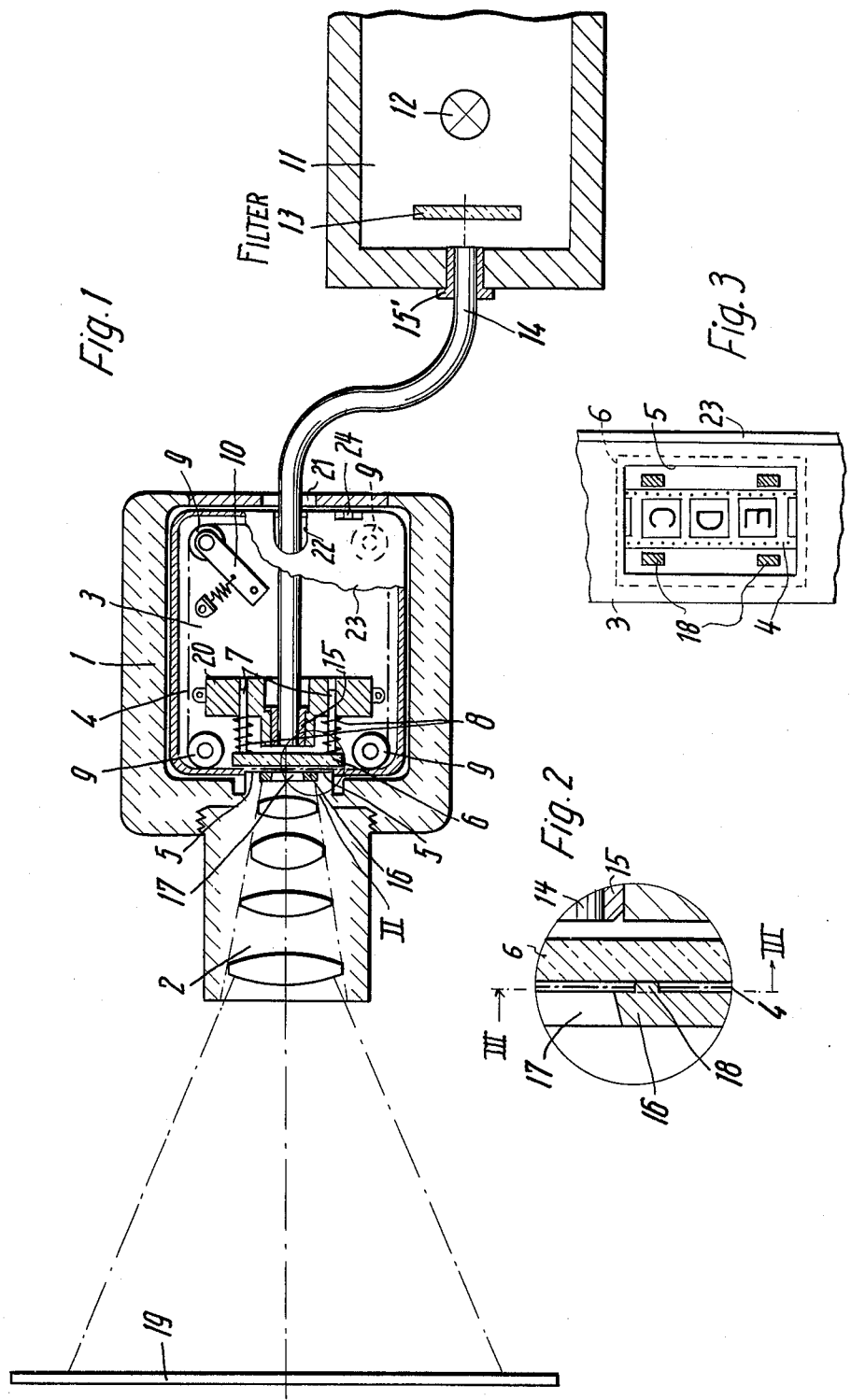

TESTING DEVICE FOR CINEMATOGRAPHIC CAMERAS

FIELD OF THE INVENTION

My present invention relates to a device for the testing of cinematographic cameras of the type in which a driving element, forming part of a film-transport mechanism, is engageable with a mating element on a film cartridge inserted into the camera for advancing the film thereof in timed relationship with the operation of the camera shutter.

BACKGROUND OF THE INVENTION

The optical performance of a camera objective may be tested by placing a transparency with a test pattern in the camera adjacent the shutter and transluminating it for projecting its image onto an external screen via the camera objective. This technique, however, does not furnish clues as to the proper alignment of the film frames with the optical system which heretofore could be checked only by exposing the test film in the camera and subsequently developing that film.

OBJECT OF THE INVENTION

The object of my present invention is to provide a device facilitating the simultaneous checking of both the optical and the mechanical performance of a motion-picture camera of the aforedescribed type without the need for exposing, developing and inspecting a special film.

SUMMARY OF THE INVENTION

This object is realized, in accordance with my present invention, by the provision of a cartridge insertable into the camera to be tested, the cartridge being internally provided with a set of rollers for leading an endless test film therein past a window in its front wall upon emplacement of the cartridge in the camera and coupling of one of the rollers in the usual manner with the film-transport mechanism. The film, which carries a series of test frames, is then transluminated by a light source disposed at least in part in the cartridge in line with its window.

According to a more specific feature of my invention, the light source comprises a fiber-optical cable which terminates at one end just behind the test film in the camera and whose other end confronts a lamp in the light box. The use of such a cable permits light to be piped into the cartridge without interfering with the positioning and movement of the endless film. Advantageously, the cable can be plugged into both the cartridge and the light box with the aid of detachable connectors. Also, according to a further feature of my invention, the light box is preferably equipped with a radiation filter which can be inserted between the lamp and the confronting cable end to protect the film against overheating, particularly when the film transport is arrested to check the performance of the objective.

BRIEF DESCRIPTION OF THE DRAWING

These and other features of my invention will now be described in detail with reference to the accompanying drawing in which:

FIG. 1 is a somewhat diagrammatic view, in sectional elevation, of a motion-picture camera provided with a testing device according to my invention;

FIG. 2 is an enlarged detail view of a segment encompassed in circle II of FIG. 1; and FIG. 3 is a fragmentary cross-sectional view taken on the line III — III of FIG. 2.

SPECIFIC DESCRIPTION

The drawing shows a conventional motion-picture camera 1 having a nonillustrated side door for the insertion of a film cartridge with a wind-up reel engageable by a motor-driven or possibly manually operated stud on the inner wall of the camera housing for the transportation of the film past an aperture 17 in a collar 16 also accomodating the usual shutter and diaphragm (not shown). Aperture 17 is aligned with an objective 2 through which, in normal use, external scenes are focused upon the film.

In accordance with my present invention, a special cartridge 3 is inserted into the camera 1 in lieu of the usual certridge of undeveloped film. Special cartridge 3 contains a set of four rollers 9 supporting an endless developed test film 4 which is held under tension by a spring-loaded arm 10 carrying one of the rollers. The front wall of cartridge 3 has a window 5 overlain by a transparent backing plate 6 which is guided by bolts 7 in a support 20 and is pressed by springs 8 against the film so as to establish a predetermined image plane for the film 4. Window 5 is an opening wider than film 4 (see FIG. 3) but slightly narrower than plate 6, giving access to bosses 18 of collar 16 which bracket the film 4 and bear upon plate 6 to determine the proper spacing of the film from objective 2. This film carries a series of test frames with patterns of various kinds, such as rasters, circles, stars and alphanumerical characters.

A screen 19 is positioned at a suitable distance in front of objective 2 to receive the images of the test frames upon translumination of the film 4 by a source of light comprising a lamp 12 in a box 11 and a fiber-optical cable 14 extending from that box to a location just rearwardly of pressure plate 6. The flexibility of cable 14 allows it to be introduced via an asymmetrically positioned aperture 21 in a camera housing and a cut-out 22 in a cover 23 hinged at 24 to the cartridge 3. The front and rear ends of cable 14 are provided with respective plugs 15 and 15' which can be detachably fitted into respective sockets formed on support 20 and light box 11.

In order to protect the film 4 against excessive radiant heat, particularly during standstill of the transport mechanism, light box 11 contains a filter 13 which can be interposed between the lamp 12 and the confronting extremities of light-conducting cable 14.

Naturally, the test cartridge 3 can also be used in a camera designed to be loaded from the rear rather than from the side as assumed above.

The described system enables the complete testing of the performance of the camera with the film 4 either in motion or held stationary with a selected frame thereof confronting the objective 2.

I claim:

1. A device for testing the performance of a camera provided with an objective and with film-transport means for aligning successive film frames with said objective, comprising a light box, a cartridge insertable into said camera and provided with a front wall having a window, a set of rollers in said cartridge, an endless test film in said cartridge led around said rollers past said window for entrainment by said film-transport means, and a fiber-optical cable extending from said light box into said cartridge to a location in line with said window behind said film for transluminating same.

2. A device as defined in claim 1 wherein said cartridge is provided with pressure means adjacent said window for holding an adjoining portion of said film onto said front wall.

3. A device as defined in claim 2 wherein said pressure means comprises a spring-loaded transparent plate overlying said window behind said film.

4. A device as defined in claim 1 wherein said light box, said cartridge and said cable are provided with connectors for coupling same to one another in a releasable manner.

5. A device as defined in claim 1 wherein said light box is internally provided with a lamp and with heat-protective filter means interposable between said lamp and an extremity of said cable.

6. A device as defined in claim 1, further comprising a spring-loaded transparent pressure plate overlying said window behind said film for urging same toward said objective, said cable terminating behind said plate.

7. A device as defined in claim 6 wherein said plate extends laterally beyond said film for engagement by spacers on the camera straddling said film, said window being an opening wider than said film to accommodate said spacers.

* * * * *